United States Patent
Hsu et al.

(10) Patent No.: US 10,203,094 B2
(45) Date of Patent: Feb. 12, 2019

(54) LIGHT EMITTING DEVICE AND IMAGE SURVEILLANCE APPARATUS THEREOF

(71) Applicant: VIVOTEK INC., New Taipei (TW)

(72) Inventors: Hsiang-Lin Hsu, New Taipei (TW); Ping-Yu Lai, New Taipei (TW); Yi-Hsin Yeh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 224 days.

(21) Appl. No.: 15/343,224

(22) Filed: Nov. 4, 2016

(65) Prior Publication Data

US 2017/0146222 A1 May 25, 2017

(30) Foreign Application Priority Data

Nov. 19, 2015 (TW) .............................. 104138239 A

(51) Int. Cl.
*G02B 7/04* (2006.01)
*G02B 7/10* (2006.01)
(Continued)

(52) U.S. Cl.
CPC .............. *F21V 17/02* (2013.01); *F21V 5/007* (2013.01); *H04N 5/2252* (2013.01);
(Continued)

(58) Field of Classification Search
CPC .......... F21V 17/02; F21V 17/04; F21V 5/007; F21V 29/508; F21V 29/74; H04N 5/2252; H04N 5/2254; H04N 5/2256; H04N 7/183; G08B 13/19619; G08B 13/19626; G03B 15/05; G03B 2215/0592; G03B 2215/0503; G03B 2215/0567; G03B 15/03;
(Continued)

(56) References Cited

U.S. PATENT DOCUMENTS

| 5,150,260 A * | 9/1992 | Chigira | .................... G02B 7/08 359/694 |
| 5,748,394 A * | 5/1998 | Shimazaki | ............... G02B 7/08 359/822 |

(Continued)

FOREIGN PATENT DOCUMENTS

| TW | M352851 | 3/2009 |
| TW | 201132910 A1 | 10/2011 |

(Continued)

*Primary Examiner* — Nathnael Aynalem
(74) *Attorney, Agent, or Firm* — Winston Hsu

(57) ABSTRACT

A light emitting device includes a casing, a lighting module, and a lens module. The lighting module is disposed in the casing for providing light and includes first and second light sources. The lens module faces the lighting module and includes a first lens aligned with the first light source, a second lens aligned with the second light source, a sliding frame, and a driving motor. The sliding frame is fixed to the first lens and has a thread portion. The driving motor has a screw rod for engaging with the thread portion, to make the sliding frame movable along the screw rod. The driving motor rotates the screw rod to make the thread portion drive the first and second lenses close to or away from the first and second light sources. Accordingly, the present invention reduces the manufacturing cost of the light emitting device and simplifies its mechanical design.

19 Claims, 7 Drawing Sheets

(51) Int. Cl.
*F21V 17/02* (2006.01)
*F21V 5/00* (2018.01)
*H04N 7/18* (2006.01)
*H04N 5/225* (2006.01)
*G08B 13/196* (2006.01)

(52) U.S. Cl.
CPC ......... *H04N 5/2254* (2013.01); *H04N 5/2256* (2013.01); *H04N 7/183* (2013.01); *G08B 13/19619* (2013.01); *G08B 13/19626* (2013.01)

(58) Field of Classification Search
CPC .... G03B 15/0442; G02B 7/005; G02B 7/105; G02B 7/09; G02B 7/10; G02B 7/04; G02B 7/12; G02B 7/022
See application file for complete search history.

(56) References Cited

U.S. PATENT DOCUMENTS

| | | | | |
|---|---|---|---|---|
| 7,126,763 B2 * | 10/2006 | Sasaki | ................... | G02B 7/022 |
| | | | | 359/696 |
| 7,339,756 B2 * | 3/2008 | Tengeiji | ................. | G02B 7/021 |
| | | | | 359/694 |
| 7,755,859 B2 * | 7/2010 | Lee | ........................ | G02B 7/023 |
| | | | | 359/811 |
| 8,944,647 B2 * | 2/2015 | Bueeler | ..................... | F21K 9/00 |
| | | | | 362/296.01 |
| 10,012,361 B2 * | 7/2018 | Stavely | ..................... | F21V 5/007 |
| 2006/0245309 A1 * | 11/2006 | Saito | ....................... | G02B 7/023 |
| | | | | 369/1 |
| 2007/0091602 A1 * | 4/2007 | van Voorst Vader | ....................... | |
| | | | | G03B 15/05 |
| | | | | 362/244 |
| 2009/0153981 A1 * | 6/2009 | Lee | ......................... | G02B 7/102 |
| | | | | 359/696 |
| 2013/0064531 A1 * | 3/2013 | Pillman | ............... | H04N 5/23296 |
| | | | | 396/62 |
| 2013/0163257 A1 * | 6/2013 | Shum | ..................... | G03B 15/03 |
| | | | | 362/319 |
| 2013/0170220 A1 * | 7/2013 | Bueeler | ..................... | F21K 9/00 |
| | | | | 362/296.01 |
| 2014/0197314 A1 * | 7/2014 | Afrooze | ............. | H05B 33/0842 |
| | | | | 250/338.1 |
| 2015/0211708 A1 * | 7/2015 | Stavely | ................... | F21V 5/007 |
| | | | | 348/164 |
| 2016/0215961 A1 * | 7/2016 | Kjeldsen | ................. | F21V 14/06 |

FOREIGN PATENT DOCUMENTS

| | | |
|---|---|---|
| TW | M426957 U1 | 4/2012 |
| TW | 201333525 A1 | 8/2013 |

* cited by examiner

LIGHT EMITTING DEVICE AND IMAGE SURVEILLANCE APPARATUS THEREOF

BACKGROUND OF THE INVENTION

1. Field of the Invention

The present invention relates to a light emitting device and an image surveillance apparatus thereof, and more specifically, to a light emitting device utilizing a screw rod of a driving motor to be engaged with the a thread portion of a sliding frame for driving lenses close to or away from light sources in parallel and an image surveillance apparatus thereof.

2. Description of the Prior Art

In general, an image surveillance device has a light emitting device (e.g. an infrared light emitting diode) disposed therein for providing auxiliary light, so that the image surveillance device could capture clear images even in a dark environment (e.g. indoor place or place at night). A conventional light emitting design involves disposing a lens in front of the light emitting device to make alight emitting range of the light emitting device conform to an image capturing range of an image capturing module. In practical application, since the image capturing module has a zooming function for zooming in a surveillance object in the distance, the light emitting device also needs to have a lens zooming module for condensing light to a zoomed-in region, so as to improve the image capturing quality of the image surveillance device.

However, since the lens zooming module adopts a gear driving mechanism for driving the lens to perform a zooming-out or zooming-in operation or for focusing the lens, the mechanical design of the light emitting device is usually complicated and has a high manufacturing cost. Furthermore, the aforesaid gear driving mechanism may have poor gear transmission accuracy when receiving external impact, so as to influence the zooming accuracy of the light emitting device.

SUMMARY OF THE INVENTION

The present invention provides a light emitting device. The light emitting device includes a casing, a lighting module, and at least one lens module. The lighting module is disposed in the casing for providing light. The lighting module includes a first light source and a second light source. The second light source is adjacent to the first light source. The at least one lens module movably faces the lighting module. The at least one lens module includes a first lens, a second lens, a sliding frame, and a driving motor. The first lens is aligned with the first light source. The second lens extends from the first lens. The second lens is aligned with the second light source. The sliding frame is fixed to the first lens. The sliding frame has a thread portion. The driving motor has a screw rod. The screw rod is engaged with the thread portion to make the sliding frame movable along the screw rod. The driving motor is used to provide a driving force for making the thread portion drive the first lens and the second lens close to or away from the first light source and the second light source in parallel via the sliding frame with rotation of the screw rod.

The present invention further provides an image surveillance apparatus. The image surveillance apparatus includes a housing, an image capturing device, and a light emitting device. The image capturing device is disposed in the housing for capturing images. The light emitting device is disposed in the housing. The light emitting device includes a casing, a lighting module, and at least one lens module. The lighting module is disposed in the casing for providing light. The lighting module includes a first light source and a second light source. The second light source is adjacent to the first light source. The at least one lens module movably faces the lighting module. The at least one lens module includes a first lens, a second lens, a sliding frame, and a driving motor. The first lens is aligned with the first light source. The second lens extends from the first lens. The second lens is aligned with the second light source. The sliding frame is fixed to the first lens. The sliding frame has a thread portion. The driving motor has a screw rod. The screw rod is engaged with the thread portion to make the sliding frame movable along the screw rod. The driving motor is used to provide a driving force for making the thread portion drive the first lens and the second lens close to or away from the first light source and the second light source in parallel via the sliding frame with rotation of the screw rod.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
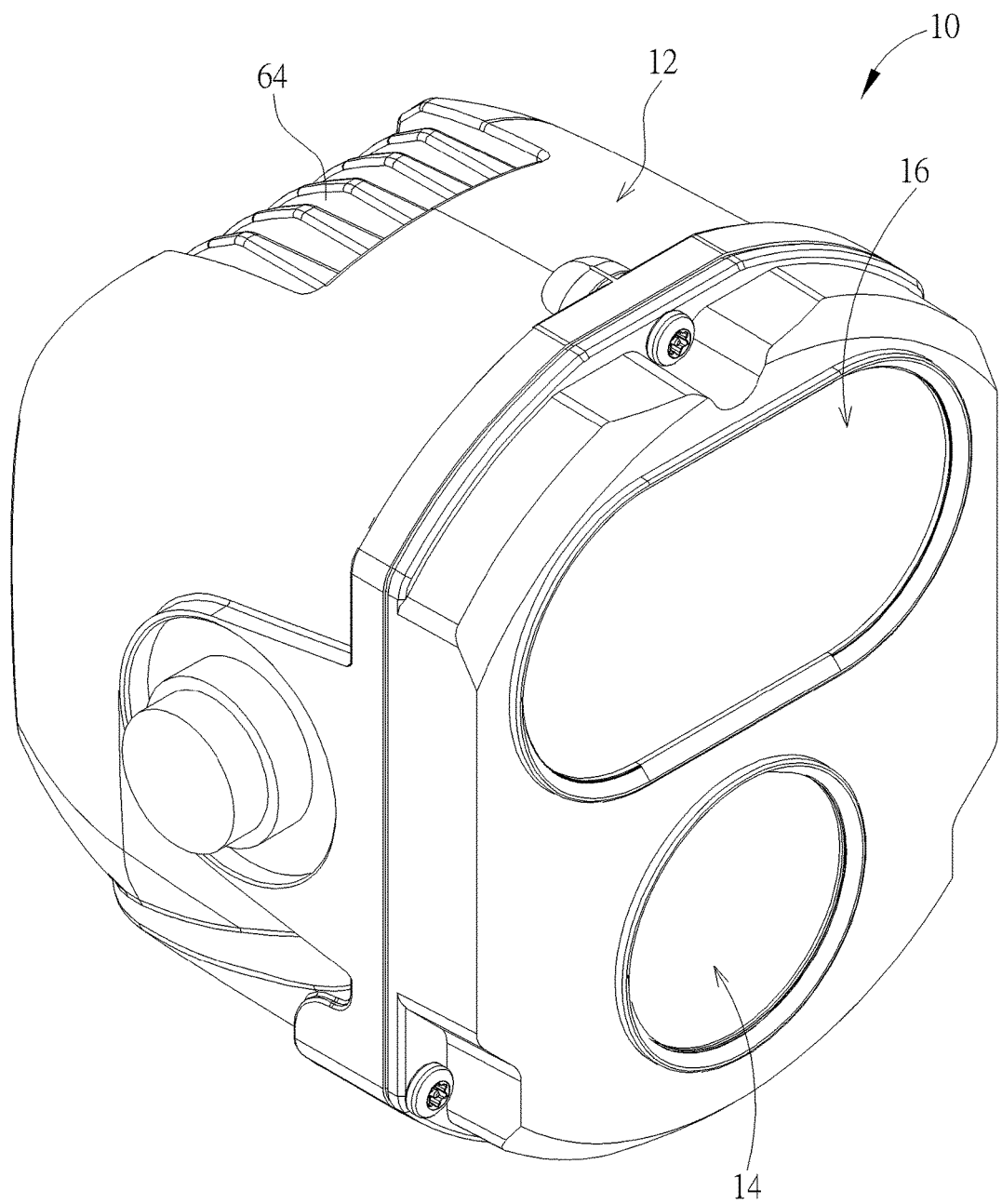
FIG. 1 is a diagram of an image surveillance apparatus according to an embodiment of the present invention.

Please refer to FIG. 1, which is a diagram of an image surveillance apparatus 10 according to an embodiment of the present invention. As shown in FIG. 1, the image surveillance apparatus 10 could be preferably a camera device (e.g. IP camera) for image surveillance and could include a housing 12, an image capturing device 14, and a light emitting device 16. The image capturing device 14 is disposed in the housing 12 for capturing images for subsequent image processing (e.g. image surveillance), and the related description is omitted herein since it is commonly seen in the prior art.

Figure 2:
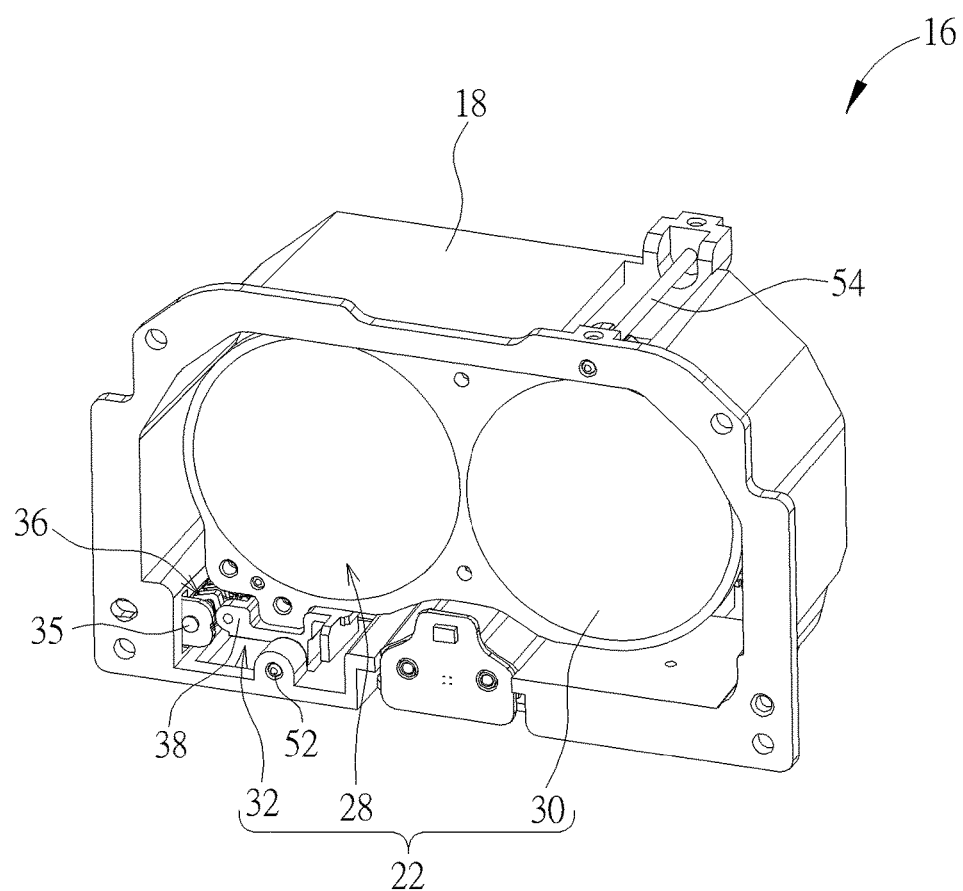
FIG. 2 is a diagram of a light emitting device in FIG. 1.
Figure 3:
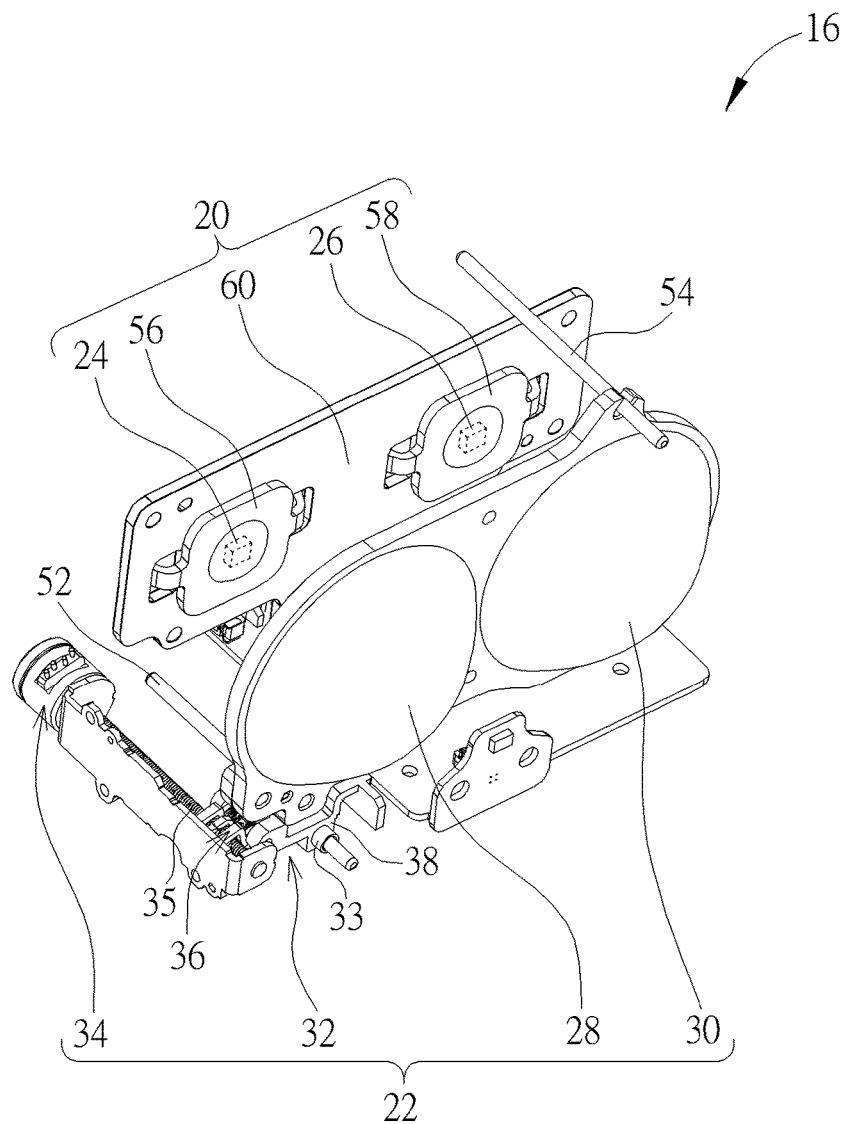
FIG. 3 is a diagram of the light emitting device in FIG. 2 from another viewing angle.

The light emitting device 16 is disposed in the housing 12 for providing illumination light to the image capturing device 14, so that the image capturing device 14 could still capture clear images even in a dark environment (e.g. indoor place or place at night). More detailed description for the design of the light emitting device 16 is provided as follows. Please refer to FIG. 1, FIG. 2, and FIG. 3. FIG. 2 is a diagram of the light emitting device 16 in FIG. 1. FIG. 3 is a diagram of the light emitting device 16 in FIG. 2 from another viewing angle. As shown in FIG. 1, FIG. 2, and FIG. 3, the light emitting device 16 includes a casing 18, a lighting module 20, and at least one lens module 22 (one shown in FIG. 1, but not limited thereto, meaning that amount of the lens module 22 could vary according to amount of the light source in the lighting module 20). For clearly showing the internal mechanical design of the light emitting device 16, the casing 18 is omitted in FIG. 3. The lighting module 20 is disposed in the casing 18 and includes a first light source 24 and a second light source 26 (briefly depicted by dotted lines in FIG. 3). The first light source 24 and the second light source 26 are adjacent to each other and could be a light emitting unit (e.g. an infrared light emitting diode, but not limited thereto, meaning that they could be other type of light emitting diode, such as a visible light emitting diode) commonly applied to a conventional image surveillance device. The lens module 22 movably faces the lighting module 20 and includes a first lens 28, a second lens 30, a sliding frame 32, and a driving motor 34. The first lens 28 is aligned with the first light source 24. The second lens 30 extends from the first lens 28 and is aligned with the second light source 26. Accordingly, the first light source 24 and the second light source 26 could provide light for the image capturing device 14 via the first lens 28 and the second lens 30 respectively. The sliding frame 32 is fixed to the first lens 28 (e.g. by a screw locking method, but not limited thereto) and has a thread portion 36. The driving motor 34 has a screw rod 35. The screw rod 35 is engaged with the thread portion 36 to make the sliding frame 32 movable along the screw rod 35.

In such a manner, when the driving motor 34 drives the screw rod 35 to rotate, the thread portion 36 could drive the first lens 28 and the second lens 30 with rotation of the screw rod 35 to move close to or away from the first light source 24 and the second light source 26 in parallel for adjusting a light emitting angle of the light emitting device 16. A maximum travelling distance of the first lens 28 and the second lens 30 relative to the first light source 24 and the second light source 26 could be preferably equal to a focal distance of the first lens 28 or the second lens 30. That is, in this embodiment, when the first lens 28 and the second lens 30 move to a position as shown in FIG. 3, a travelling distance from the first lens 28 and the second lens 30 to the first light source 24 and the second light source 26 could be preferably equal to the focal distance of the first lens 28 and the second lens 30 (in this embodiment, the first lens 28 and the second lens 30 could have the same focal distance), but not limited thereto, meaning that the aforesaid travelling distance could vary according to the practical application of the image surveillance apparatus 10.

Figure 4:
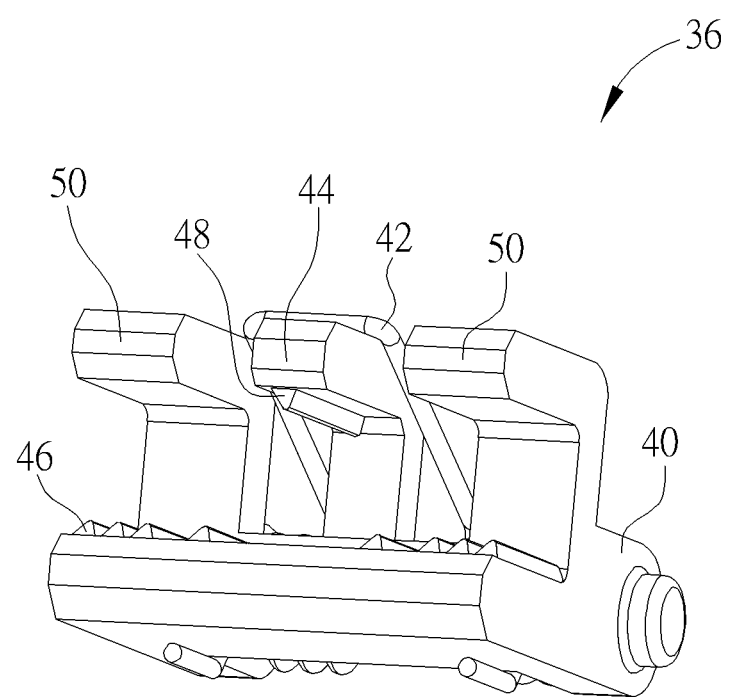
FIG. 4 is an enlarged diagram of a thread portion in FIG. 3.

To be more specific, please refer to FIG. 3 and FIG. 4. FIG. 4 is an enlarged diagram of the thread portion 36 in FIG. 3. As shown in FIG. 3 and FIG. 4, in this embodiment, the sliding frame 32 could further have a main base 38. The thread portion 36 could have a shaft base 40, a torsion spring 42, and an elastic clamping claw 44. The shaft base 40 is pivoted to the main base 38 and has a first thread 46 facing the screw rod 35. The elastic clamping claw 44 is connected to the shaft base 40 and has a second thread 48 facing the screw rod 35. The torsion spring 42 abuts against the shaft base 40 and the elastic clamping claw 44 for providing elastic force to drive the shaft base 40 and the elastic clamping claw 44 to cooperatively clamp the screw rod 35. Accordingly, the first thread 46 and the second thread 48 could be surely engaged with the screw rod 35 to enhance engagement between the thread portion 36 and the screw rod 35 (about larger than 90%), so that the thread portion 36 could move along the screw rod 35 steadily. Furthermore, the shaft base 40 could have at least one guiding claw 50 (two shown in FIG. 4, but not limited thereto) adjacent to the elastic clamping claw 44. The guiding claw 50 abuts against the screw rod 35 to assist the shaft base 40 and the elastic clamping claw 44 to move along the screw rod 35 in an undeflected manner. In such a manner, movement of the elastic clamping claw 44 and the shaft base 40 along the screw rod 35 could be more steady, so as to efficiently improve the lens zooming accuracy of the light emitting device 16.

Furthermore, the light emitting device 16 could further include a first guiding rod 52 and a second guiding rod 54. The first guiding rod 52 is fixed to the casing 18 and passes through the sliding frame 32 for guiding the first lens 28 to move along the first guiding rod 52 via the sliding frame 32. The second guiding rod 54 could be preferably diagonal to the first guiding rod 52 and fixed to the casing 18. The second guiding rod 54 passes through the second lens 30 for guiding the second lens 30 to move along the second guiding rod 54. In such a manner, via diagonal disposal of the first guiding rod 52 and the second guiding rod 54, the lens module 22 could move more steadily relative to the lighting module 20, so as to efficiently improve the lens zooming accuracy of the light emitting device 16. Furthermore, as shown in FIG. 3, the sliding frame 32 could have at least one sleeve portion 33 (one shown in FIG. 3, but not limited thereto, meaning that the sliding frame 32 could adopt the design that the sleeve portions 33 are respectively formed at a front side and a back side of a position where the first guiding rod 52 passes through the sliding frame 32) to sleeve the first guiding rod 52, so as to ensure that the sliding frame 32 could move along the first guiding rod 52 in an undeflected manner. Accordingly, movement smoothness of the lens module 22 relative to the lighting module 20 could be further improved.

Moreover, as shown in FIG. 3, in this embodiment, the lens module 22 could further include a first condensing lens 56 and a second condensing lens 58. The first condensing lens 56 is disposed between the first light source 24 and the first lens 28 for condensing light provided by the first light source 24. The second condensing lens 56 is disposed between the second light source 26 and the second lens 30 for condensing light provided by the second light source 26. In this embodiment, the first condensing lens 56 and the second condensing lens 58 could be a TIR (Total Internal Reflection) lens, but not limited thereto, meaning that the first condensing lens 56 and the second condensing lens 58 could be other optical component (e.g. a reflective cup or a convex lens) having a light condensing function in another embodiment. To be noted, the first condensing lens 56 and the second condensing lens 58 could be omitted for simplifying the design of the lens module 22. Furthermore, amount of the first light source 24, the second light source 26, the first condensing lens 56, and the second condensing lens 58 is not limited to the aforesaid embodiment but varies according to the practical application of the image surveillance apparatus 10.

Figure 5:
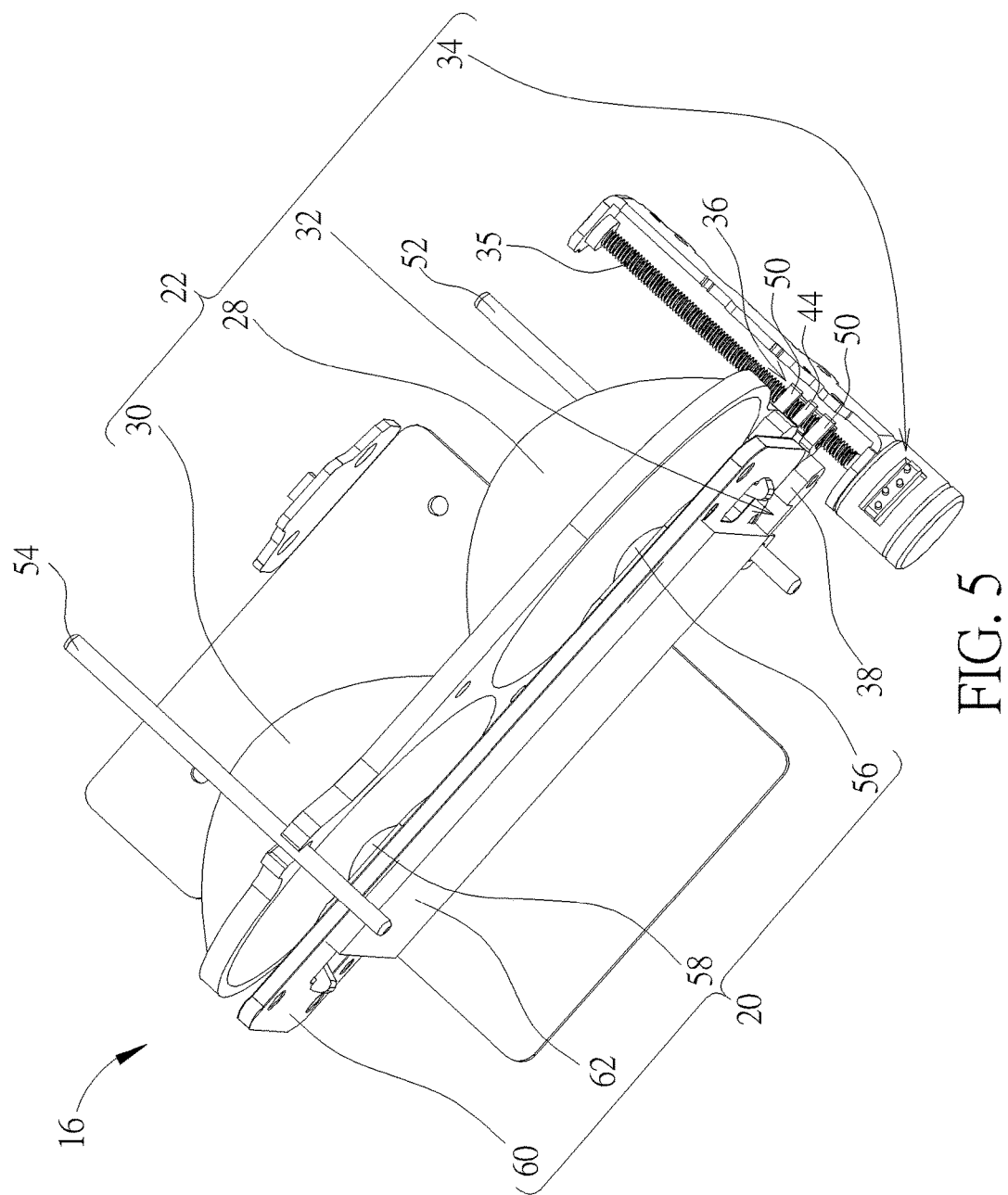
FIG. 5 is a diagram of a first lens and a second lens in FIG. 3 moving close to a first light source and a second light source in parallel.

Via the aforesaid designs, when a light emitting angle of the light emitting device 16 needs to be adjusted to make the light emitting range of the light emitting device 16 cover an image capturing region of the image capturing device 14, the driving motor 34 could drive the thread portion 36 to move the first lens 28 and the second lens 30 close to or away from the first light source 24 and the second light source 26 in parallel via the sliding frame 32 with rotation of the screw rod 35, so as to adjust the light emitting angle of the light emitting device 16. For example, if the image capturing device 14 zooms out its shooting field-of-view and the light emitting angle of the light emitting device 16 needs to be enlarged for providing light with a larger illumination range to the image capturing range of the image capturing device 14, the driving motor 34 could rotate the screw rod 35 to drive the thread portion 36 to move the first lens 28 and the second lens 30 close to the first lens 28 and the second lens 30 in parallel via the sliding frame 32 (e.g. moving from a position away from the first light source 24 and the second light source 26 as shown in FIG. 3 to a position close to the first light source 24 and the second light source 26 as shown in FIG. 5, but not limited thereto), so as to enlarge the light emitting angle of the light emitting device 16. On the other hand, if the image capturing device 14 zooms in its shooting field-of-view and the light emitting angle of the light emitting device 16 needs to be reduced for providing light with a smaller illumination range to the image capturing region of the image capturing device 14, the driving motor 34 could rotate the screw rod 35 to drive the thread portion 36 to move the first lens 28 and the second lens 30 away from the first lens 28 and the second lens 30 in parallel via the sliding frame 32 (e.g. moving from the position close to the first light source 24 and the second light source 26 as shown in FIG. 5 to the position away from the first light source 24 and the second light source 26 as shown in FIG. 3, but not limited thereto), so as to reduce the light emitting angle of the light emitting device 16.

In practical application, since the present invention adopts the design that the lighting module 20 is fixed in the housing 12, the image surveillance apparatus 10 could preferably adopt a fixed heat-dissipating design for heat dissipation of the lighting module 20. That is, as shown in FIG. 1 and FIG. 5, the lighting module 20 could further have a control circuit board 60 on which the first light source 24 and the second light source 26 are disposed for controlling the first light source 24 and the second light source 26. The control circuit board 60 is preferably made of material with high heat conductivity (e.g. aluminum). The lighting module 20 could further have a heat conduction sheet 62. The heat conduction sheet 62 is attached to the control circuit board 60 and is preferably made of material with high heat conductivity (e.g. thermal silica gel). Furthermore, a heat-dissipating fin structure 64 could be formed on the housing 12 corresponding to the light emitting device 16. In such a manner, the present invention could efficiently dissipate heat generated by the lighting module 20 via the heat conduction sheet 62 and the heat-dissipating fin structure 64. Furthermore, compared with the prior art design for disposing a fan module on a lighting module, the aforesaid design that the heat conduction sheet 62 is directly attached on the lighting module 20 fixed in the housing 12 could solve the prior art problem that the fan module is easily damaged in an environment with a high temperature.

Figure 6:
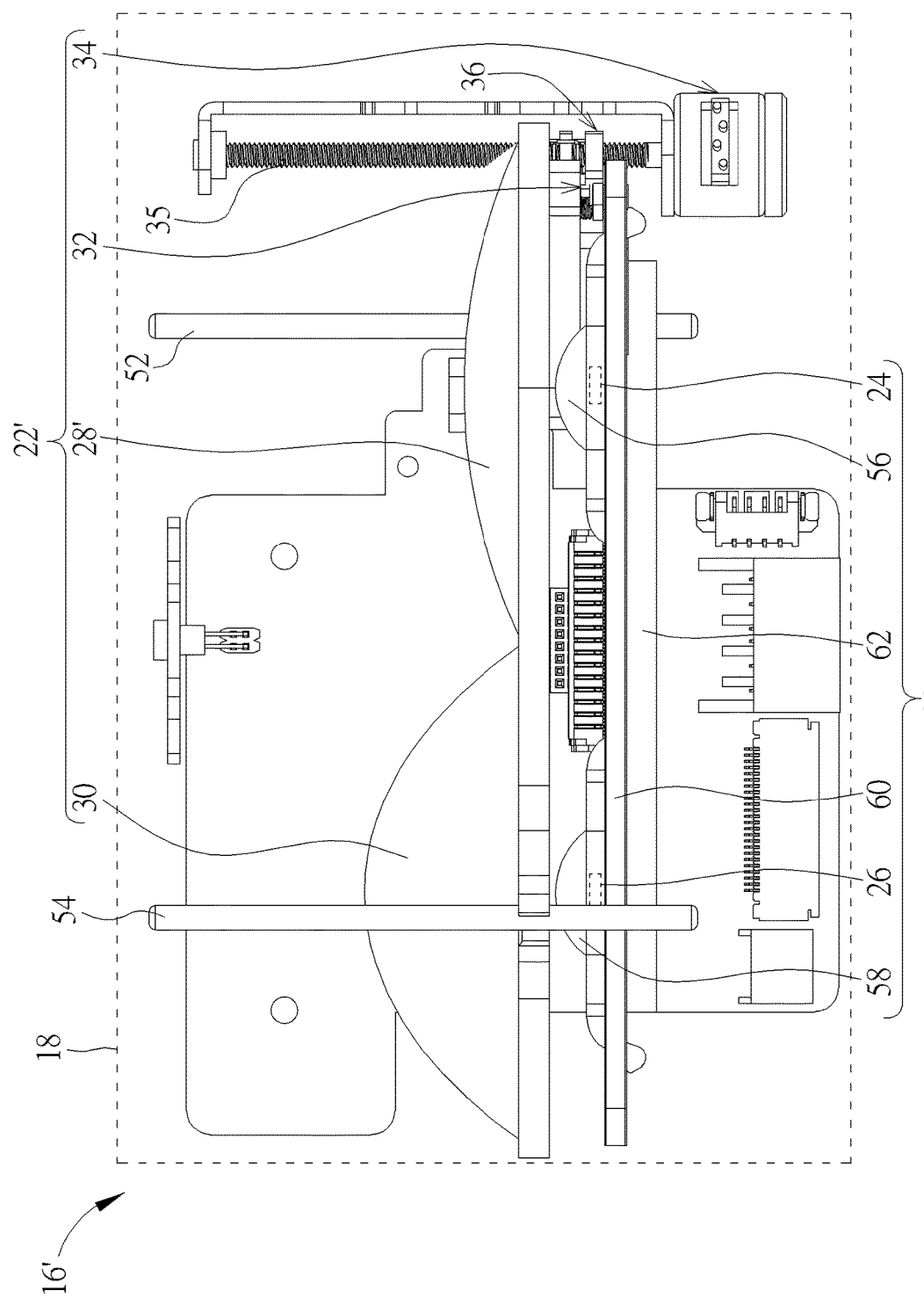
FIG. 6 is a top view of a light emitting device according to another embodiment of the present invention.
Figure 7:
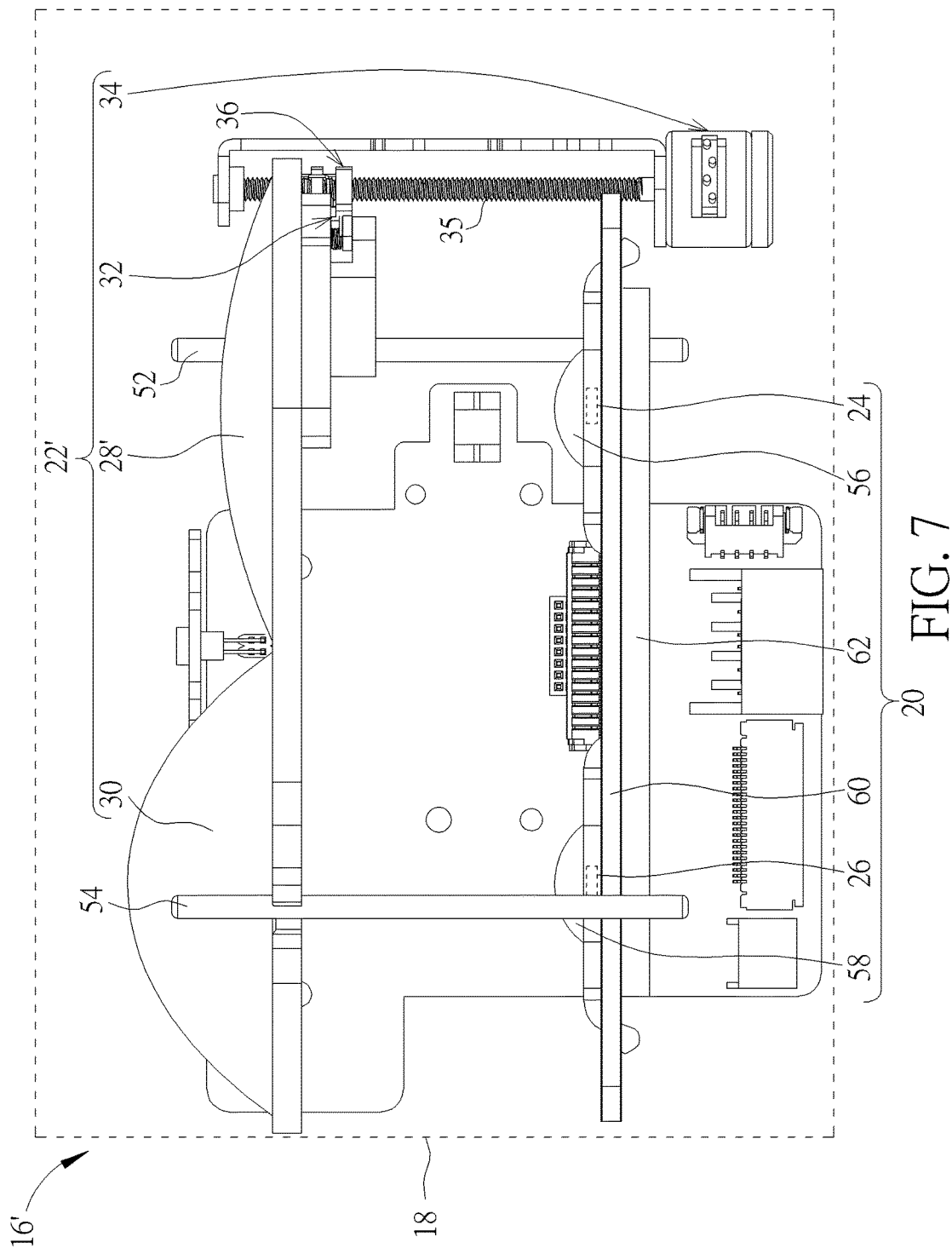
FIG. 7 is a top view of a first lens and the second lens in FIG. 6 moving away from the first light source and the second light source.

It should be mentioned that the zooming design of the present invention is not limited to the aforesaid embodiment. For example, please refer to FIG. 6 and FIG. 7. FIG. 6 is a top view of a light emitting device 16' according to another embodiment of the present invention. FIG. 7 is a top view of a first lens 28' and the second lens 30 in FIG. 6 moving away from the first light source 24 and the second light source 26. Components both mentioned in this embodiment and the aforesaid embodiment represent components with similar structures or functions, and the related description is omitted herein. As shown in FIG. 6 and FIG. 7, the light emitting device 16' could include the casing 18, the lighting module 20, and a lens module 22'. For clearly showing the internal mechanical design of the light emitting device 16', the casing 18 is briefly depicted by dotted lines in FIG. 6 and FIG. 7. The lens module 22' movably faces the lighting module 20 and includes the first lens 28', the second lens 30, the sliding frame 32, and the driving motor 34. In this embodiment, the first lens 28' is aligned with the first light source 24, and the second lens 30 extends from the first lens 28' and is aligned with the second light source 26. A first curvature of the first lens 28' could be less than a second curvature of the second lens 30, but not limited thereto, meaning that all the designs in which the first curvature of the first lens 28' is different from the second curvature of the second lens 30 (e.g. the first curvature of the first lens 28' is larger than the second curvature of the second lens 30) could be adopted by the present invention.

Via the aforesaid designs, if the light emitting angle of the light emitting device 16 needs to be enlarged for providing light with a larger illumination range, the driving motor 34 could rotate the screw rod 35 to make the thread portion 36 move the first lens 28' and the second lens 30 close to the first light source 24 and the second light source 26 in parallel via the sliding frame 32 (e.g. moving from a position away from the first light source 24 and the second light source 26 as shown in FIG. 7 to a position close to the first light source 24 and the second light source 26 as shown in FIG. 6). At this time, if only the first light source 24 is turned on, the light emitting device 16 could have a relatively larger light emitting angle (e.g. 90°, but not limited thereto) since the first lens 28' has a smaller curvature. If only the second light source 26 is turned on, the light emitting device 16 could have a relatively smaller light emitting angle (e.g. 60°, but not limited thereto) since the second lens 30 has a larger curvature. If the first light source 24 and the second light source 26 are turned on simultaneously, the light emitting device 16 could provide light with higher intensity within a light emitting range corresponding to the second lens 30 (e.g. within 60°, but not limited thereto).

On the other hand, if the light emitting angle of the light emitting device 16 needs to be reduced for providing light with a smaller illumination range, the driving motor 34 could rotate the screw rod 35 to make the thread portion 36 move the first lens 28' and the second lens 30 away from the first light source 24 and the second light source 26 in parallel via the sliding frame 32 (e.g. moving from the position close to the first light source 24 and the second light source 26 as shown in FIG. 6 to the position away from the first light source 24 and the second light source 26 as shown in FIG. 7). At this time, if only the first light source 24 is turned on, the light emitting device 16 could have a relatively larger light emitting angle (e.g. 10°, but not limited thereto) since the first lens 28' has a smaller curvature. If only the second light source 26 is turned on, the light emitting device 16 could have a relatively smaller light emitting angle (e.g. 4°, but not limited thereto) since the second lens 30 has a larger curvature. If the first light source 24 and the second light source 26 are turned on simultaneously, the light emitting device 16 could provide light with higher intensity within a light emitting range corresponding the second lens 30 (e.g. within 4°, but not limited thereto).

To be noted, disposal of the first guiding rod and the second guiding rod and the design that the thread portion has the shaft base, the torsion spring, the elastic clamping claw, and the guiding claw could be selectively omitted for simplifying the mechanical design of the light emitting device. That is, in another embodiment, the driving motor could drive the first lens and the second lens close to or away from the first light source and the second light source in parallel only by thread engagement between the screw rod of the driving motor and the thread portion of the sliding frame. As for which design is utilized, it depends on the practical manufacturing needs of the light emitting device provided by the present invention.

Compared with the prior art, the present invention adopts the design that the screw rod of the driving motor is engaged with the thread portion of the sliding frame for driving the first lens and the second lens close to or away from the first light source and the second light source in parallel, to achieve the lens zooming purpose. In such a manner, the present invention not only reduces the manufacturing cost of the light emitting device and simplifies the mechanical design of the light emitting device, but also prevents the prior art problem that the zooming accuracy of the light emitting device could be influenced easily when the gear driving mechanism receives external impact.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A light emitting device comprising:
a casing;
a lighting module disposed in the casing for providing light, the lighting module comprising:
a first light source; and
a second light source adjacent to the first light source; and
at least one lens module movably facing the lighting module, the at least one lens module comprising:
a first lens aligned with the first light source;
a second lens extending from the first lens, the second lens being aligned with the second light source;
a sliding frame fixed to the first lens, the sliding frame having a thread portion and a main base, the thread portion having a shaft base, a torsion spring, and an elastic clamping claw, the shaft base being pivoted to the main base and having a first thread, the elastic clamping claw being connected to the shaft base and having a second thread, and the torsion spring being connected to the shaft base and the elastic clamping claw; and
a driving motor having a screw rod, the first thread and the second thread facing the screw rod, the torsion spring providing an elastic force to drive the shaft base and the elastic clamping claw to cooperatively clamp the screw rod for making the first thread and the second thread engaged with the screw rod respectively and making the sliding frame movable along the screw rod, the driving motor being used to provide a driving force for making the thread portion drive the first lens and the second lens close to or away from the first light source and the second light source in parallel via the sliding frame with rotation of the screw rod.

2. The light emitting device of claim 1, wherein the shaft base has at least one guiding claw adjacent to the elastic clamping claw, and the at least one guiding claw abuts against the screw rod to assist the shaft base and the elastic clamping claw to move along the screw rod in an undeflected manner.

3. The light emitting device of claim 1, wherein the first lens has a first curvature, the second lens has a second curvature, and the first curvature is different from the second curvature.

4. The light emitting device of claim 1 further comprising:
a first guiding rod fixed to the casing, the first guiding rod passing through the sliding frame for guiding the first lens to move along the first guiding rod via the sliding frame.

5. The light emitting device of claim 4 further comprising:
a second guiding rod fixed to the casing and diagonal to the first guiding rod, the second guiding passing through the second lens for guiding the second lens to move along the second guiding rod.

6. The light emitting device of claim 4, wherein the sliding frame has at least one sleeve portion formed at a position where the first guiding rod passes through the sliding frame, and the at least one sleeve portion sleeves the first guiding rod to make the sliding frame move along the first guiding rod in an undeflected manner.

7. The light emitting device of claim 1, wherein a maximum travelling distance of the first lens and second lenses relative to the first light source and the second light source is equal to a focal distance of one of the first lens and the second lens.

8. The light emitting device of claim 1, wherein the at least one lens module further comprises:
a first condensing lens disposed between the first light source and the first lens for condensing light provided by the first light source; and
a second condensing lens disposed between the second light source and the second lens for condensing light provided by the second light source.

9. The light emitting device of claim 1, wherein the lighting module further comprises a control circuit board and a heat conduction sheet, the first light source and the second light source are disposed on the control circuit board, and the heat conduction sheet is attached to the control circuit board for dissipating heat energy generated by the lighting module when the lighting module is operated.

10. An image surveillance apparatus comprising:
a housing;
an image capturing device disposed in the housing for capturing images; and
a light emitting device disposed in the housing, the light emitting device comprising:
a casing;
a lighting module disposed in the casing for providing light, the lighting module comprising:
a first light source; and
a second light source adjacent to the first light source; and
at least one lens module movably facing the lighting module, the at least one lens module comprising:
a first lens aligned with the first light source;
a second lens extending from the first lens, the second lens being aligned with the second light source;
a sliding frame fixed to the first lens, the sliding frame having a thread portion and a main base, the thread portion having a shaft base, a torsion spring, and an elastic clamping claw, the shaft base being pivoted to the main base and having a first thread, the elastic clamping claw being connected to the shaft base and having a second thread, and the torsion spring being connected to the shaft base and the elastic clamping claw; and a driving motor having a screw rod, the first thread and the second thread facing the screw rod, the torsion spring providing an elastic force to drive the shaft base and the elastic clamping claw to cooperatively clamp the screw rod for making the first thread and the second thread engaged with the screw rod respectively and making the sliding frame movable along the screw rod, the driving motor being used to provide a driving force for making the thread portion drive the first lens and the second lens close to or away from the first light source and the second light source in parallel via the sliding frame with rotation of the screw rod.

11. The image surveillance apparatus of claim 10, wherein the shaft base has at least one guiding claw adjacent to the elastic clamping claw, and the at least one guiding claw abuts against the screw rod to assist the shaft base and the elastic clamping claw to move along the screw rod in an undeflected manner.

12. The image surveillance apparatus of claim 10, wherein the first lens has a first curvature, the second lens has a second curvature, and the first curvature is different from the second curvature.

13. The image surveillance apparatus of claim 10, wherein the light emitting device further comprises:
a first guiding rod fixed to the casing, the first guiding rod passing through the sliding frame for guiding the first lens to move along the first guiding rod via the sliding frame.

14. The image surveillance apparatus of claim 13, wherein the light emitting device further comprises:
a second guiding rod fixed to the casing and diagonal to the first guiding rod, the second guiding passing through the second lens for guiding the second lens to move along the second guiding rod.

15. The image surveillance apparatus of claim 13, wherein the sliding frame has at least one sleeve portion formed at a position where the first guiding rod passes through the sliding frame, and the at least one sleeve portion sleeves the first guiding rod to make the sliding frame move along the first guiding rod in an undeflected manner.

16. The image surveillance apparatus of claim 10, wherein a maximum travelling distance of the first lens and second lenses relative to the first light source and the second light source is equal to a focal distance of one of the first lens and the second lens.

17. The image surveillance apparatus of claim 10, wherein the at least one lens module further comprises:
a first condensing lens disposed between the first light source and the first lens for condensing light provided by the first light source; and
a second condensing lens disposed between the second light source and the second lens for condensing light provided by the second light source.

18. The image surveillance apparatus of claim 10, wherein the lighting module further comprises a control circuit board and a heat conduction sheet, the first light source and the second light source are disposed on the control circuit board, and the heat conduction sheet is attached to the control circuit board for dissipating heat energy generated by the lighting module when the lighting module is operated.

19. The image surveillance apparatus of claim 10, wherein a heat-dissipating fin structure is formed on the housing corresponding to the light emitting device.

* * * * *